Patented Aug. 2, 1949

2,478,008

UNITED STATES PATENT OFFICE 2,478,008

PROCESS OF PRODUCING A SOLID PENTACHLOROPROPANE

Ralph E. Plump, Pittsfield, Mass., assignor to The Pennsylvania Salt Manufacturing Company, Philadelphia, Pa., a corporation of Pennsylvania No Drawing. Original application May 27, 1943, Serial No. 488,737. Divided and this application April 2, 1947, Serial No. 738,929

5 Claims. (Cl. 204—163)

The present invention relates to a process for the preparation of a solid pentachloropropane, and more particularly it relates to a process for the production of 1,1,1,2,3, pentachloropropane ($CH_2Cl.CHCl.CCl_3$) by the direct chlorination of 1,1,1,2, tetrachloropropane ($CH_3.CHCl.CCl_3$). This application is a division of my co-pending application Serial No. 488,737 filed May 27, 1943, now Patent No. 2,420,975.

This pentachloropropane is a white crystalline solid, having the odor of camphor, and is soluble in organic solvents but insoluble in water. It is compatible with nitrocellulose and other plastics, and, as an intermediate, it can be dehalogenated, dehydrohalogenated, and enter into other halide reactions, producing additional compounds. Heretofore, a solid pentachloropropane has not been available commercially, since the methods available for its preparation have been laborious, time-consuming, and expensive and have required special techniques and conditions of operation. These methods have involved the chlorination of 3,3,3, trichloropropene-1 or the treatment of 1,1,1, trichloro 2 bromopropane with antimony pentachloride (Beilstein, vol. I, p. 107). The starting material in both procedures is chloral, and this must be converted into 3,3,3, trichloropropanol-2 by reaction of the chloral with dimethyl zinc or a methyl magnesium halide by the Grignard synthesis requiring the use of absolute anhydrous ether. The preparation of the 3,3,3,-trichloropropanol-2 is illustrated by the following equations:

$$CCl_3.CHO + CH_3MgI + H_2O \rightarrow$$
$$CCl_3.CHOH.CH_3 + MgOHI$$
$$2CCl_3.CHO + (CH_3)_2Zn + 2H_2O \rightarrow$$
$$2CCl_3.CHOH.CH_3 + Zn(OH)_2$$

In the preparation of the pentachloropropane from 3,3,3, trichloropropene-1, the 3,3,3, trichloropropanol-2, prepared as above described, is dehydrated by phosphorus pentoxide to form the 3,3,3, trichloropropene-1, and this compound is then chlorinated. The following equations illustrate these reactions:

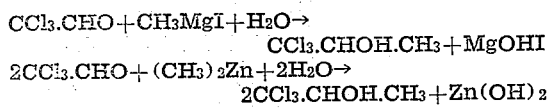
$$3CCl_3.CHOH.CH_3 + P_2O_5 \rightarrow$$
$$3CCl_3.CH=CH_2 + 2H_3PO_4$$
$$CCl_3.CH=CH_2 + Cl_2 \rightarrow CCl_3.CHCl.CH_2Cl$$

In the preparation of the pentachloropropane from 1,1,1, trichloro, 2 bromopropane, the 3,3,3,-trichloropropanol-2, obtained from chloral as above described, is reacted with phosphorus trichloride, and the resulting chloro compound is treated with bromine to form the 1,1,1, trichloro, 2 bromopropane, which in turn is reacted with antimony pentachloride to form 1,1,1,2,3, pentachloropropane, this series of reactions are illustrated by the following equations:

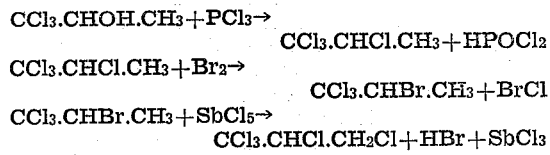
$$CCl_3.CHOH.CH_3 + PCl_3 \rightarrow$$
$$CCl_3.CHCl.CH_3 + HPOCl_2$$
$$CCl_3.CHCl.CH_3 + Br_2 \rightarrow$$
$$CCl_3.CHBr.CH_3 + BrCl$$
$$CCl_3.CHBr.CH_3 + SbCl_5 \rightarrow$$
$$CCl_3.CHCl.CH_2Cl + HBr + SbCl_3$$

The reactants required in these procedures command high prices, and the combination of the expense of the methods with the difficulties presented in handling the products and the purification thereof prohibits the use of these processes on an industrial scale. As an alternative to the involved methods described, attempts have been made to synthesize the pentachloropropane directly from propane or propylene, but these attempts have resulted in liquid mixtures which are very difficult to separate into the various components of the reaction, and have had no industrial significance.

One object of the present invention, therefore, is to provide a simple, direct, and efficient process for the production of a solid pentachloropropane.

A further object of the invention is to provide a method by which 1,1,1,2,3, pentachloropropane of high purity may be prepared in a single stage chlorination and with a minimum of further processing.

Other objects will be apparent from a consideration of this specification and the claims.

In accordance with the process of the present invention, the pentachloropropane is formed by the chlorination of 1,1,1,2, tetrachloropropane, either produced as an intermediate product in the reaction or employed as the starting material in the chlorination process. Thus, the pentachloropropane may be formed by chlorinating 1,1,1,2, tetrachloropropane or 1, 1, dichloropropene-1. If the dichloropropene-1 is employed as the initial reactant, the chlorine satisfies the double bond of the compound to form the tetrachloropropane, and the further chlorination produces the pentachloropropane. Hence, the claims which are directed to the step of chlorinating 1,1,1,2, tetrachloropropane cover the process broadly and include the use of 1,1, dichloropropene-1 and of 1,1,1,2, tetrachloropropane and of a mixture thereof as initial reactant. The reactions are illustrated by the following equations:

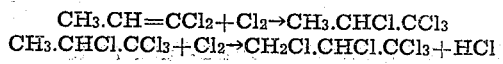

The 1,1,1,2, tetrachloropropane or the 1,1, dichloropropene-1 may be obtained from any suitable source and the purity of the material need not be high. The dichloropropene-1 is easily prepared by the treatment of 2,2,3, trichlorobutanal-1 (butyl chloral) with an alkali, such as caustic soda (Beilstein, vol. I, p. 199), in accordance with the following equation:

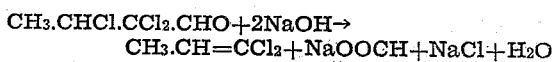

The 2,2,3, trichlorobutanal-1 may be economically produced by the process of the copending application of Ralph L. Brown and Ralph E. Plump, Serial No. 377,572, filed February 5, 1941, now Patent No. 2,351,000. In my co-pending application Serial No. 488,738 filed May 27, 1943, now Patent No. 2,370,577, a process is described by which 2,2,3, trichlorobutyric acid may be prepared by the chlorate oxidation of 2,2,3, trichlorobutanal-1, and if desired, the steam distillate from the purification of the trichlorobutyric acid from the reaction mixture may serve as the source of the material to be chlorinated. This steam distillate usually contains some 1,1,1,2, tetrachloropropane and some unreacted 2,2,3, trichlorobutanal-1, and the latter compound may be converted into 1,1, dichloropropene-1 by treatment with alkali, such as caustic soda. The material then may be dried, if desired, by the use of calcium chloride or other drying agent.

In accordance with the process of the present invention, the chlorine is brought into contact with the 1,1,1,2, tetrachloropropane and/or the 1,1, dichloropropene-1, and the pentachloropropane is produced by direct chlorination. If 1,1, dichloropropene-1 or a mixture containing this substance is chlorinated, the material may be mixed with a catalyst, for example, ferric chloride in an amount between about 0.05% and 0.5% based on the dichloropropene-1, and chlorine may then be brought into contact with the material at a temperature between about 0° C. to 30° C., specifically in the neighborhood of 20° C. while the material is agitated. This procedure will convert the 1,1, dichloropropene-1 into 1,1,1,2, tetrachloropropane. Any other procedure may be followed in converting the 1,1, dichloropropene-1 into the tetra-chloro compound and this step of conversion is not in itself a feature of the present invention.

While in the chlorination of the 1,1,1,2, tetrachloropropane to form the solid pentachloropropane, the reaction will take place without catalysis thereof, the reaction advantageously is catalyzed, since the chlorination then takes place at a faster rate, at a lower temperature, and in a more satisfactory and complete manner. The reaction may be catalyzed by actinic light rays, such as sunlight or ultraviolet rays, preferably the latter, or by the addition of a chlorination catalyst to the material to be chlorinated. Examples of chlorination catalysts are ferric chloride, antimony tri- or pentachloride, phosphorus pentachloride, chlorosulphonic acid, ferric oxide, ferric sulphate, sulphur, iodine, red phosphorus, copper chloride, aluminum chloride, tetraethyl lead, stannic chloride, and the like. Of these, the ferric compounds, such as ferric chloride, ferric sulphate, and ferric oxide, are preferred. The catalyst need only be present in a small quantity to be highly effective, for example, from about 0.05% to 0.5%, although larger amounts may be employed, if desired.

The chlorine is supplied to the material to be chlorinated until the chlorination is completed to form the pentachloropropane, and a moderate excess of chlorine over that required does not deleteriously affect the product. The chlorine is brought into contact with the material to be chlorinated under conditions favoring its absorption by the material treated. Hence, since the dispersion of the chlorine and its contact with the reacting liquid affects the extent to which it is utilized, active agitation and the use of a disperser, for example, a fritted glass disc or other type of dispersion plate or plates, has been found effective in the process. The rate of gas passage into the reaction vessel is in general at least the maximum at which substantially complete utilization is obtained. Actually, this rate is a complex function of temperature, catalyst, and design of the apparatus, but the rate at which the chlorine is to be supplied may easily be determined in any particular instance. During the chlorination, an excess of chlorine over that required at any instant by the reaction rate is advantageously available in order to minimize darkening of the product and to substantially eliminate side reactions. While the amount of excess chlorine need not be large, it is desirable that there be a ready availability of chlorine for reaction at all times, say an excess of 1% to 10% over that reacting with the material to be chlorinated. The chlorine which escapes from the reacting vessel may, of course, be recirculated.

The chlorination may be conducted at any temperature at which the chlorination will proceed at the rate desired. The temperature employed in any particular case will be dependent upon whether or not a catalyst is employed and the nature of the catalyst. For example, in a process where the reaction is catalyzed by ultraviolet light, the reaction will proceed at 25° C. or lower. Generally, however, temperatures above about 65° C., and more specifically above 80° C., will be employed. The upper limit of the temperature will also depend upon the presence or absence of a catalyst and the nature thereof, and the desired purity of the product, since it is possible to overchlorinate the material, which results in a material heavier than pentachloropropane. Advantageously, the temperature employed, irrespective of the presence or absence of a catalyst and the nature thereof, will be between about 80° C. and 180° C., temperatures within the range of from 120° C. to 150° C., more specifically in the neighborhood of 130° C. to 140° C., being particularly suitable in most instances.

The process is advantageously conducted at atmospheric pressure, but due to the lower solubility of hydrochloric acid as compared to chlorine in the reaction mixture, it may be advantageous to employ sub-atmospheric pressure. On the other hand, pressures greater than atmospheric pressure may at times have a beneficial effect due to the increased solubility of the chlorine in the reacting liquid, but, as stated, normally the use of atmospheric pressure with adequate agitation is preferred.

Other substances, such as water, may be present with the material to be chlorinated, and the presence of these materials may affect the rate of chlorination, for example, it has been found that the presence of water, say from 1% to about 10% of water, decreases the rate of chlorination, but has the advantage of allowing the product to be separated in a condition exceptionally free from contaminants, and of eliminating charring effects during the reaction.

Toward the end of the reaction, a solid material will form in the reaction mixture, if the reaction temperature is below the melting point of the pentachloropropane in the presence of the other material. In any event, the pentachloropropane separates from the reaction mixture when it is cooled. The pentachloropropane may be separated from the oily material of the reaction mixture by any suitable means as by filtration, and the catalyst, if one was employed, may be removed by washing the solid product with acidified water. The resulting solid product is a technical grade of pentachloropropane, melting in the neighborhood of 140° C. Yields of this technical grade of product of 80% or more are obtainable by the process of the present invention. This pentachloropropane product may be purified by recrystallization from a solution of a suitable organic solvent such as ethanol. The pure grade has a melting point not lower than about 178° C.

The reaction may be carried out in simple, non-specialized equipment, and agitation may be furnished mechanically or merely by the incoming gas. The process of the present invention may be conducted as a batch process or as a semi-continuous or continuous process.

When 1,1,dichloropropene-1 or a mixture containing this substance is chlorinated, the chlorination may proceed without interruption from the 1,1,dichloropropene-1 through the 1,1,1,2,tetrachloropropane to the solid pentachloropropane, with only such change in the temperature conditions as may be necessary to obtain a satisfactory conversion of the tetrachloropropane to the pentachloropropane.

As pointed out above, the product of the process is a solid pentachloropropane and although the process of the invention is not to be limited to the production of a solid pentachloropropane of any particular molecular arrangement, identification tests of the product lead to the conclusion that the product is 1,1,1,2,3,pentachloropropane. These identification tests have included a comparison of the melting point of the product with the melting point data in the literature for the material obtained by other methods, and by molecular weight and chlorine determination. The product was also identified by a second and different synthesis through chlorination of 3,3,3,trichloropropene-1 prepared from 1,1,1,2,tetrachloropropane by dehydrohalidization with alcoholic potash. The properties of the pentachloropropane prepared in accordance with this process of the invention resemble somewhat those of hexachloroethane, and the product is generally similar to camphor in its vapor pressure, melting point, odor, and waxy characteristics when compressed.

The following examples are illustrative of the process of the present invention:

Example 1

Crude 1,1,1,2,tetrachloropropane (1084 gm.) (containing some 1,1,dichloropropene-1), catalyzed by 1 gm. of anhydrous ferric chloride, was chlorinated (fritted glass disperser) in a flask fitted with reflux condenser. The introduction of chlorine gas was begun at a temperature of 105° C. and after ten minutes the temperature had risen to 120° C. and darkening of the mixture occurred. The flask contents were cooled to 60° C. at which point chlorination was continued for 1¼ hours. The temperature was then raised to 100° C. and the chlorination continued for 6¾ hours. The total time of chlorination was 8 hours and 10 minutes, and solid material had formed in the flask and condenser. On cooling, 1343 gm. of slightly slushy solid was obtained, which was washed with acidified water to remove the ferric chloride and filtered with suction. The solid product obtained was pentachloropropane. A small quantity of oil (D. 1.64, 80 cc.) was separated by the filtration. In this example, substantially complete conversion of starting material to the desired isomeric form of pentachloropropane was obtained.

Example 2

Crude 1,1,1,2,tetrachloropropane (360 gm.) (containing some 1,1,dichloropropene-1), catalyzed by 1 gm. of anhydrous ferric chloride, was chlorinated for 30 minutes at 100° C. and then at 120° C.–130° C. for 3¾ hours. During the last 15 minutes, crystalline material formed in the reaction liquid and in the neck of the flask. A crude solid mass, weighing 440 gm. was obtained on cooling. On pressing out on a suction funnel 40 cc. of an oil (D. 1.55) were separated. Two recrystallizations of the solid from alcohol gave material melting at 179° C., the recorded m. p. for 1,1,1,2,3,-pentachloropropane.

Example 3

1,1,1,2,tetrachloropropane (171 gm.) obtained by saturating 1,1,dichloropropene-1 with chlorine below 45° C. to which 0.5 gm. of ferric chloride and 5 cc. of water had been added, was chlorinated for 3 hours at 93°–95° C. when 36 gm. of solid were separated on cooling. The filtrate was rechlorinated another 3 hours at 93°–95° C. and 20 gm. of solid were separated. Finally, after 2½ hours more of chlorination, the reaction product was distilled and that part distilling in the range 160°–195° C. gave 16.5 gm. of solid pentachloropropane on good chilling.

Example 4

1,1,1,2,tetrachloropropane (125 cc.) to which 12 cc. of water had been added was chlorinated at the boiling point of the mixture for 10½ hours. On cooling, 77 gm. of solid pentachloropropane and 119 gm. liquid chloropropane was obtained.

Example 5

1,1,1,2, tetrachloropropane (26 gm.) catalyzed by 0.3–0.4 gm. chlorosulphonic acid was chlorinated with slowly rising temperature up to 130° C. where the temperature was held for a short time, but after 35 minutes from the start the temperature was raised to 150° C. At this temperature and after two hours (total time) the specific gravity of the reaction liquid rose to 1.55. The chlorination was then continued for another hour (total 3 hours) after which an appreciable quantity of solid mass separated when chilled. This solid was pentachloropropane and upon a single recrystallization from ethanol had a melting point of 174°–175° C.

Example 6

1,1,1,2, tetrachloropropane (24.7 gm.), catalyzed by 0.25 gm. antimony trichloride, was chlorinated at 150° C. for 3.75 hours and then at 175° C. for 0.25 hour. The reaction product, on cooling and filtering, gave 16 gm. of crude pentachloropropane, which melted at 178° C. after a single recrystallization from ethanol.

Example 7

1,1,1,2, tetrachloropropane (25.9 gm.), catalyzed by 0.3 gm. phosphorus pentachloride, was chlorinated for 4 hours at 150° C. The reaction product now had a $D_4^{20}$ of 1.54 and after good cooling a solid crude product was separated which sintered at 140° C. and quickly evaporated at about 184° C.

Example 8

A chlorination at 65° C. on 12.4 gm. of 1,1,1,2, tetrachloropropane, catalyzed by 0.1 gm. $FeCl_3$ and 0.1 gm. $I_2$, was carried out for 19 hours. The reaction product was chilled and filtered, and the 2 gm. of crude solid obtained, after two recrystallizations from ethanol, melted at 183° C.–184° C. (the melting range for high quality 1,1,1,2,3, pentachloropropane).

Example 9

A chlorination at 80° C.–85° C. on about 10 cc. of 1,1,1,2, tetrachloropropane saturated with $FeCl_3$ was carried out for 7.5 hours. The reaction product was chilled and filtered and the crude pentachloropropane weighed about 5 gm.

Example 10

A chlorination was carried out on 5 cc. of 1,1,1,2, tetrachloropropane exposed, at a distance of about twelve inches, to the light of a 200 watt mercury vapor lamp. The reaction temperature was at no time higher than 40° C. and was between 25° C.–40° C. After 1.5 hours typical crystals appeared in the liquid, and after a total reaction time of 2.5 hours, the reaction product was chilled and filtered. This gave 3.4 gm. of crude solid which, crystallized once from ethanol, melted at 180° C.–181° C. with rapid evaporation. The density of the filtrate was about 1.56.

Example 11

1,1,1,2, tetrachloropropane (20 cc.), catalyzed by 0.2 gm. of $Fe_2(SO_4)_3 \cdot XH_2O$, was chlorinated at 140° C.–150° C. for 2 hours, when the specific gravity was found to be 1.55, and solid tended to separate. However, the chlorination was continued for a third hour and then the reaction mixture was cooled and filtered. This gave 9 gm. of crude pentachloropropane which, recrystallized twice from ethanol, melted at 178° C.

Example 12

1,1,1,2, tetrachloropropane (15 cc.), catalyzed by about 0.1 gm. $Fe_2O_3$, was chlorinated at 100° C. for 2 hours. When the reaction product was cooled to about 25° C., the entire batch became solid, and when it was pressed out on a suction filter only 1.5 cc. of oil was obtained, indicating a high degree of conversion to solid pentachloropropane.

Example 13

An uncatalyzed chlorination was carried out on 23.7 gm. of 1,1,1,2, tetrachloropropane at its boiling point, which was about 154° C. After 2 hours, the $D_4^{20}$, which initially was 1.48 at 20° C. was found to be 1.497. Chlorination for 3 hours more raised the density to 1.521. After 3 hours longer chlorination, the density was found to be 1.540 and the temperature of the boiling liquid was about 160° C. The chlorination was again resumed and in the next hour solid material was observed in the reflux condenser, but the treatment was continued for a final 2 hour period. The total reaction time was 11 hours, and the reaction temperature had risen to 166° C. About 2 gm. of crude solid pentachloropropane was obtained on cooling, and the $D_4^{20}$ of the filtrate was 1.56.

Considerable modification is possible in the conditions under which the chlorination is conducted, as well as in the choice of the catalyst if one is employed, without departing from the essential features of the present invention.

I claim:

1. The steps of producing a solid pentachloropropane-containing product in which a solid pentachloropropane isomer having a melting point of about 180° C. predominates and from which said isomer may be separated, which comprises introducing chlorine into 1,1,1,2, tetrachloropropane in liquid phase in the presence of actinic light rays at a temperature below about 65° C. to replace one hydrogen atom of said tetrachloropropane by a chlorine atom and to produce said pentachloropropane isomer, and thereafter recovering the solid product containing said solid pentachloropropane isomer from the reaction mixture.

2. The process of claim 1, wherein the temperature of chlorination is above about 25° C.

3. The process of claim 1, wherein the actinic light rays are ultra-violet rays.

4. The process of claim 1 wherein the actinic light rays are ultra-violet rays and wherein the temperature of chlorination is above about 25° C.

5. The process of claim 1, wherein the actinic light rays are provided by mercury vapor lamp and wherein the temperature is between about 25° C. and about 40° C.

RALPH E. PLUMP.

REFERENCES CITED

The following references are of record in the file of this patent:

UNITED STATES PATENTS

| Number | Name | Date |
|---|---|---|
| 1,308,760 | Lacy | July 8, 1919 |
| 1,362,355 | Saunders et al. | Dec. 14, 1920 |
| 1,459,777 | Lieser et al. | June 26, 1923 |
| 1,674,472 | Jaeger | June 19, 1928 |
| 2,147,577 | Hass et al. | Feb. 14, 1939 |
| 2,174,737 | Coleman et al. | Oct. 3, 1939 |
| 2,296,614 | Hearne | Sept. 22, 1942 |
| 2,420,975 | Plump | May 20, 1947 |